Patented Sept. 19, 1922.

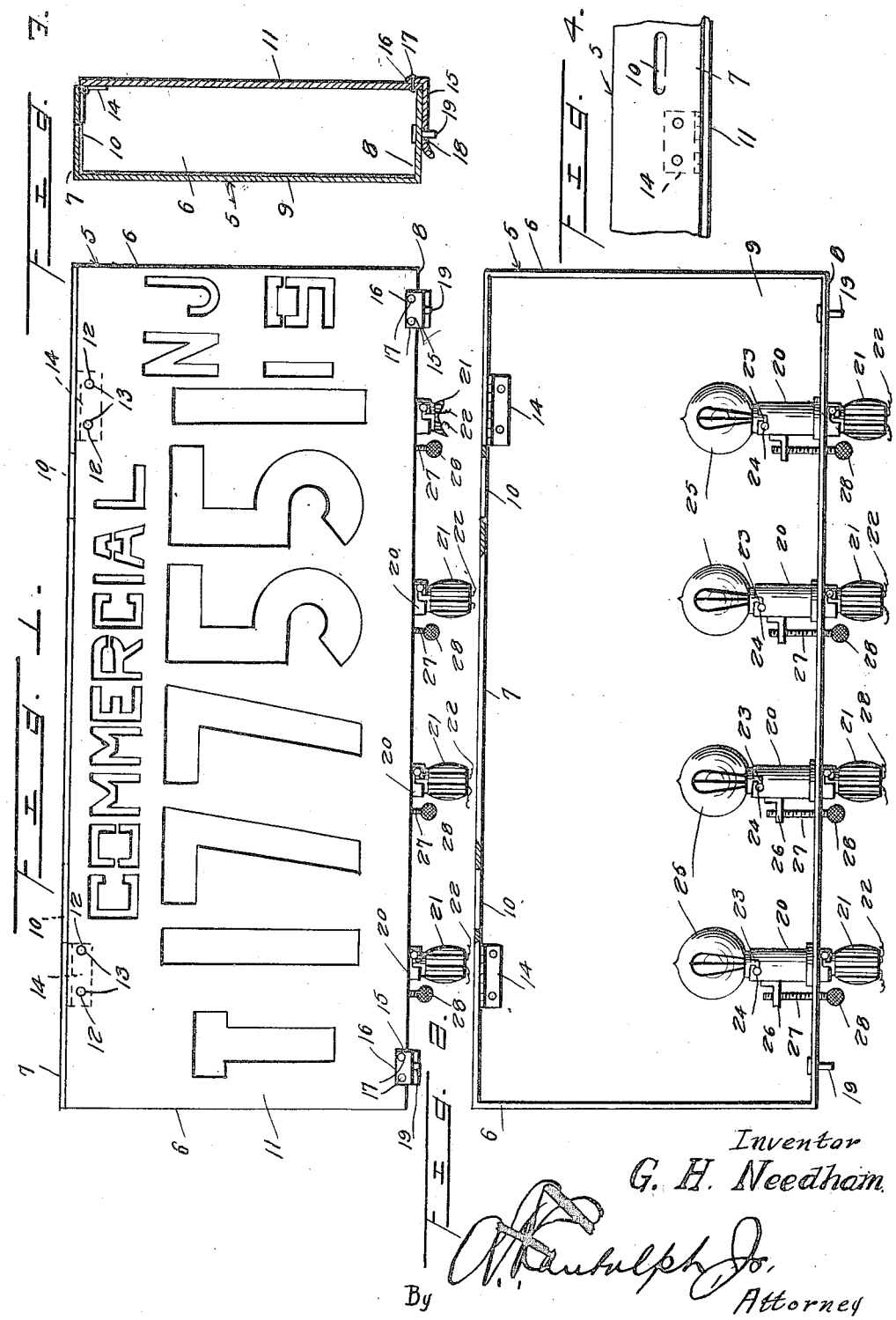

1,429,758

UNITED STATES PATENT OFFICE.

GEORGE H. NEEDHAM, OF NEWARK, NEW JERSEY, ASSIGNOR OF ONE-HALF TO GEORGE JACOB NEEDHAM, OF NEWARK, NEW JERSEY.

ILLUMINATED NUMBER PLATE.

Application filed August 22, 1919. Serial No. 319,241.

*To all whom it may concern:*

Be it known that I, GEORGE H. NEEDHAM, a citizen of the United States, residing at Newark, in the county of Essex and State of New Jersey, have invented certain new and useful Improvements in Illuminated Number Plates; and I do hereby declare the following to be a full, clear, and exact description of the invention, such as will enable others skilled in the art to which it appertains to make and use the same.

My invention relates to improvements in illuminated license plates especially adapted for use in connection with motor vehicles.

An important object of this invention is to provide novel means for supporting and illuminating the license plate of an automobile or other vehicle, whereby the same may be readily viewed after dark.

A further object of this invention is to provide novel means for supporting the electric bulbs adapted for illuminating the license plate.

A further object of the invention is to provide an illuminating license plate which is neat, efficient in use and of highly simplified construction.

Other objects and advantages of the invention will be apparent during the course of the following description.

In the accompanying drawing forming a part of this application and in which like numerals are employed to designate like parts throughout the same, Figure 1 is a front elevation of an illuminated license plate embodying my invention, Figure 2 is a similar view of the same, the cover or plate of the same being removed, Figure 3 is a transverse section through the same, and Figure 4 is a fragmentary plan view of the casing.

In the drawing wherein for the purpose of illustration is shown the preferred embodiment of my invention, the numeral 5 designates a rectangular casing having vertical end walls 6 and top and bottom walls 7 and 8 respectively. The side and end walls of the casing 5 are provided with a back 9. The top wall 7 is provided with a pair of elongated slots 10 adapted for the reception of suitable supporting means for securing the device to a vehicle or other desired place of suspension.

A license plate designated by the numeral 11 is provided along its upper longitudinal edge with pairs of spaced openings 12 adapted for the reception of suitable fastening members or bolts 13 which also extend through hinges 14 carried by the under side of the upper member 7.

Spring clips generally designated by the numeral 15 are provided with attaching flanges 16 secured to the lower longitudinal edge of the license plate 11 by rivets 17. The body portions of the spring clips are provided with apertures 18 receiving depending locking pins 19 carried by the lower side 8 of the case. When the pins 19 are received within the openings 18 in the spring clips 15, the license plate is held in closed position or over one side of the casing, 5.

As illustrated in Figure 2, I have extended a plurality of lamp sockets 20 through the lower side 8 of the casing. The lamp sockets 20 are provided at their lower ends with removable plugs 21 having connection with suitable wires 22. The upper sides of the sockets 20 are provided with the usual bayonet slots 23 receiving transversely extending pins 24 of electric bulbs 25. The sockets 20 are elongated and are provided on one side with L-shaped brackets 26 having engagement with vertical adjusting screws 27. The set screws 27 extending through the bottom 8 and are provided with suitable heads 28.

As illustrated in Figure 2, a rotary movement of the screw 27 will adjust the lamps 25 vertically. The lamps 25 may be adjusted to properly illuminate all portions of the plate which are inscribed.

In the use of my invention, it will be apparent that the case 5 is suspended from the rear or front of the vehicle as desired and that the license plate 11 is secured to one side of the same by the hinges 14. To properly illuminate the license plate over all inscribed portions of the same, the lamps 25 may be adjusted as desired.

As fastenings 13 are bolts, they removably mount the license plate so that other license plates may be substituted each year, other license period or otherwise. In view of this fact, the adjustment of the lamps 25 is especially important because the data on the different license plates used on the casing will vary somewhat and such lamps will require adjustment relatively thereto.

While I have shown and described the preferred embodiment of my invention, it is understood that such minor changes in arrangement and construction of parts may be made as will remain within the spirit of the invention and the scope of the appended claims.

Having thus described my invention, what I claim is:—

1. A license plate having light penetrating portions, a casing to detachably mount said plate, illuminating means in the casing for said plate, said illuminating means being substantially vertically adjustable relatively to the light-penetrating portion of different plates which may be mounted on said casing.

2. A license plate having light penetrating portions, a casing to detachably mount said plate, a plurality of lamps in the casing to illuminate the plate, said lamps being substantially vertically movable relatively to light penetrating portions of different plates which may be mounted on said casing, and adjusting screws extending through the casing associated with said lamp and operable exteriorly of the casing to impart vertical movement to the lamp.

In testimony whereof I affix my signature in presence of two witnesses.

GEORGE H. NEEDHAM.

Witnesses:
 FRED REIM,
 Mrs. F. REIM.